United States Patent
Susilo (10) Patent No.: US 7,724,673 B2
(45) Date of Patent: May 25, 2010

(54) APPARATUS AND METHODS OF DETERMINING CONFIGURATIONS FOR HANDLING COMMUNICATION PATH MANAGEMENT TRAFFIC

(75) Inventor: Gatot Susilo, Kanata (CA)

(73) Assignee: Alcatel Lucent, Paris (FR)

( * ) Notice: Subject to any disclaimer, the term of this patent is extended or adjusted under 35 U.S.C. 154(b) by 442 days.

(21) Appl. No.: 11/806,117

(22) Filed: May 30, 2007

(65) Prior Publication Data
US 2008/0298259 A1 Dec. 4, 2008

(51) Int. Cl.
*H04J 1/16* (2006.01)
*H04L 12/56* (2006.01)

(52) U.S. Cl. .................... 370/236.2; 370/254

(58) Field of Classification Search .......... 370/351, 370/230, 419, 254, 236.2
See application file for complete search history.

(56) References Cited

U.S. PATENT DOCUMENTS

2007/0178833 A1* 8/2007 Wahlberg et al. .......... 455/12.1

FOREIGN PATENT DOCUMENTS

WO WO 2006/070197 7/2006

OTHER PUBLICATIONS

Kawakami, T. et al., CCAMP Working Group "Method to Set up LSP Using VLAN Tag Switching"; draft-kawakami-vlan-lsp-signallijg-00.txt, Jun. 2003.
Mcfarland, M. et al., "Ethnet OAM: Key Enabler for Carrier Class Metro Ethernet Services", IEEE Communications Magazine, IEEE Service Center, NJ, vol. 43, No. 11, Nov 2005.
Aggarwal, R. et al., "OAM Mechanisms in MPLS Layer 2 Transport Networks" IEEE Communications Magazine, IEEE Service Center, NJ, vol. 42, No. 10, Oct. 2004.

* cited by examiner

*Primary Examiner*—John Pezzlo
(74) *Attorney, Agent, or Firm*—Kramer & Amado P.C.

(57) ABSTRACT

Apparatus and methods of determining configurations for handling communication path management traffic are disclosed. Respective communication path management traffic handling configurations of communication system elements that terminate a communication link, which is a portion of a communication path, are determined. If the respective communication path management traffic handling configurations indicate that the communication system elements have been configured to pass communication path management traffic associated with the communication path toward endpoints of the communication path, then communication path management traffic for managing the communication path is exchanged through the communication link. Indications of a communication path management traffic handling configuration may be exchanged between the communication system elements during establishment of the communication link.

24 Claims, 4 Drawing Sheets

APPARATUS AND METHODS OF DETERMINING CONFIGURATIONS FOR HANDLING COMMUNICATION PATH MANAGEMENT TRAFFIC

FIELD OF THE INVENTION

This invention relates generally to communications and, in particular, to determining configurations for handling communication path management traffic such as Operations, Administration and Maintenance (OAM) traffic.

BACKGROUND

The IEEE 802.3ah specification describes an Ethernet OAM specification that is intended for point-to-point and emulated point-to-point IEEE 802.3 links. Those skilled in the art will appreciate that IEEE 802.3ah and IEEE 802.3 refer to sets of specifications that are available from the Institute of Electrical and Electronics Engineers.

A point-to-point link might be between Customer Premises Equipment (CPE) and an Ethernet Bridge/Switch, for example, where the Ethernet Bridge/Switch terminates both the point-to-point link and any OAM packets received from the CPE. Point-to-point links are not limited to direct physical links between two nodes, but can also be extended to a connection between two nodes across a logical link, such as an Ethernet PseudoWire (PW) over a Multi-Protocol Label Switching (MPLS) network or an Ethernet Soft Permanent Virtual Circuit (SPVC) in an Asynchronous Transfer Mode (ATM network). In this case, a Provider Edge or PE node terminates the logical link, but might not terminate OAM packets received from a CPE. The PE node may instead tunnel an OAM packet to reach the far end PE node, which in turn may forward the OAM packet to its associated CPE.

Configuration of one or both PE nodes to terminate, instead of tunnel, OAM packets on their Ethernet Attachment Circuits (ACs) that provide a logical Ethernet path between two CPEs, for example, can lead to improper handling of OAM packets. According to current IEEE 802.3ah specifications, for instance, OAM packets are sent only on point-to-point links over a single hop. If a PE node in a path between two CPEs terminates OAM packets, then OAM packets intended to manage the complete CPE-to-CPE communication path are terminated at an intermediate point along the path, and thus do not have the desired effect of managing the complete path. Detection of such misconfigurations, however, can be difficult since current specifications and products do not provide any mechanisms for intermediate PE nodes or other equipment to exchange indications of their respective configurations.

SUMMARY OF THE INVENTION

In some embodiments of the present invention, control signalling is used to provide an indication as to whether Ethernet OAM traffic is tunnelled by the ACs interconnecting two CPEs that will use Ethernet OAM to monitor their Ethernet connectivity. This indication may be encoded in a new Type-Length-Value (TLV) triplet that is included in a label mapping message of a Targeted Label Distribution Protocol (T-LDP) session between the PEs, for example.

According to an aspect of the invention, an apparatus includes a configuration determining module and a communication path management module operatively coupled to the configuration determining module. The configuration determining module is operable to determine respective communication path management traffic handling configurations of communication system elements that terminate a communication link, which is a portion of a communication path associated with communication path management traffic. The communication path management module is operable to exchange communication path management traffic, for managing the communication path, through the communication link if the respective communication path management traffic handling configurations indicate that the communication system elements have been configured to pass communication path management traffic associated with the communication path toward endpoints of the communication path.

The apparatus may also include an interface that is operatively coupled to the configuration determining module and to the communication path management module, and is operable to enable communications through the communication link. In this case, the configuration determining module may be operable to determine the respective communication path management traffic handling configurations by receiving through the interface an indication of the communication path management traffic handling configuration of at least one of the communication system elements.

A communication link establishment module may be operatively coupled to the interface and to the configuration determining module, and be operable to establish the communication link, to receive, during establishment of the communication link, the indication of the communication path management traffic handling configuration of the at least one of the communication system elements, and to provide the received indication to the configuration determining module.

In some embodiments, the communication link is a PW between the communication system elements, the communication path comprises the communication link and respective communication links between the communication system elements and customer equipment, and the indication comprises an indication in a label mapping message received from the at least one of the communication system elements.

The PW may be an Ethernet PW, for example, in which case the communication path management traffic may be Ethernet OAM traffic.

The communication link may instead be an ATM Virtual Circuit (VC) between the communication system elements, with the communication path comprising the communication link and respective communication links between the communication system elements and customer equipment, and the indication comprising an indication in control signalling received from the at least one of the communication system elements.

The apparatus may be implemented, for example, in conjunction with a first one of the communication system elements and further include a memory storing an indication of the communication path management traffic handling configuration of the first communication system element. The configuration determining module may in this case be operable to determine the communication path management traffic handling configuration of the first communication system element by receiving from the memory the indication of the communication path management traffic handling configuration of the first communication system element, and to determine the communication path management traffic handling configuration of a second of the communication system elements by receiving through the interface an indication of the communication path management traffic handling configuration of the second communication system element.

In some embodiments, the apparatus also includes a communication link establishment module operatively coupled to the interface, to the configuration determining module, and to the memory, the communication link establishment module being operable to establish the communication link, to receive, during establishment of the communication link, the indication of the communication path management traffic handling configuration of the second communication system element, to provide the received indication to the configuration determining module, and to send to the second communication system element, through the interface, the stored indication of the communication path management traffic handling configuration of the first communication system element.

Such an apparatus may be implemented in a communication system element, as noted above, and a communication system may include a plurality of communication system elements implementing the apparatus.

A method is also provided, and includes determining respective communication path management traffic handling configurations of communication system elements that terminate a communication link, the communication link comprising a portion of a communication path associated with communication path management traffic, determining whether the respective communication path management traffic handling configurations indicate that the communication system elements have been configured to pass communication path management traffic associated with the communication path toward endpoints of the communication path, and exchanging communication path management traffic, for managing the communication path, through the communication link where it is determined that the respective communication path management traffic handling configurations indicate that the communication system elements have been configured to pass communication path management traffic associated with the communication path toward endpoints of the communication path.

Determining respective communication path management traffic handling configurations may involve receiving an indication of the communication path management traffic handling configuration of at least one of the communication system elements. The operation of receiving may include receiving the indication of the communication path management traffic handling configuration of the at least one of the communication system elements during establishment of the communication link.

As noted above, the communication link may be a PW between the communication system elements, and the communication path may comprise the communication link and respective communication links between the communication system elements and customer equipment. In this case, receiving may involve receiving the indication in a label mapping message received from the at least one of the communication system elements. If the PW comprises an Ethernet PW, the communication path management traffic may comprise Ethernet OAM traffic.

In another embodiment, the communication link comprises an ATM VC between the communication system elements, the communication path comprises the communication link and respective communication links between the communication system elements and customer equipment, and receiving comprises receiving the indication in control signalling received from the at least one of the communication system elements.

The method may be implemented in conjunction with a first one of the communication system elements. Where the first communication system element includes a memory storing an indication of the communication path management traffic handling configuration of the first communication system element, determining respective communication path management traffic handling configurations may involve determining the communication path management traffic handling configuration of the first communication system element by receiving from the memory the indication of the communication path management traffic handling configuration of the first communication system element, and determining the communication path management traffic handling configuration of a second of the communication system elements by receiving from the second communication system element an indication of the communication path management traffic handling configuration of the second communication system element.

The method may also include sending to the second communication system element the stored indication of the communication path management traffic handling configuration of the first communication system element.

Such a method may be embodied in instructions stored on a computer-readable medium, for example.

An apparatus according to another aspect of the invention includes an interface enabling communications through a communication link between first and second communication system elements that terminate the communication link, the communication link comprising a portion of a communication path, and a communication link establishment module operatively coupled to the interface, the communication link establishment module being operable to establish the communication link at the first communication system element, and to send to the second communication system element, during establishment of the communication link, an indication of a configuration of the first communication system element for handling communication path management traffic associated with the communication path.

As noted above, the communication link may be a PW between the first and second communication system elements, the communication path may comprise the communication link and respective communication links between the first and second communication system elements and customer equipment, and the indication may be an indication in a label mapping message sent to the second communication system element. If the PW is an Ethernet PW, the communication path management traffic may be Ethernet OAM traffic.

In some embodiments, the communication link comprises an ATM VC between the communication system elements, the communication path comprises the communication link and respective communication links between the communication system elements and customer equipment, and the indication comprises an indication in control signalling sent to the second communication system element.

The apparatus may also include a memory operatively coupled to the communication link establishment module, the memory storing an indication of the configuration of the first communication system element, in which case the communication link establishment module may be further operable to receive the indication from the memory.

A method is also provided, and includes configuring a first communication system element to terminate an end of a communication link between the first communication system element and a second communication system element, the communication link comprising a portion of a communication path, and sending to the second communication system element an indication of a configuration of the first communication system element for handling communication path management traffic associated with the communication path.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
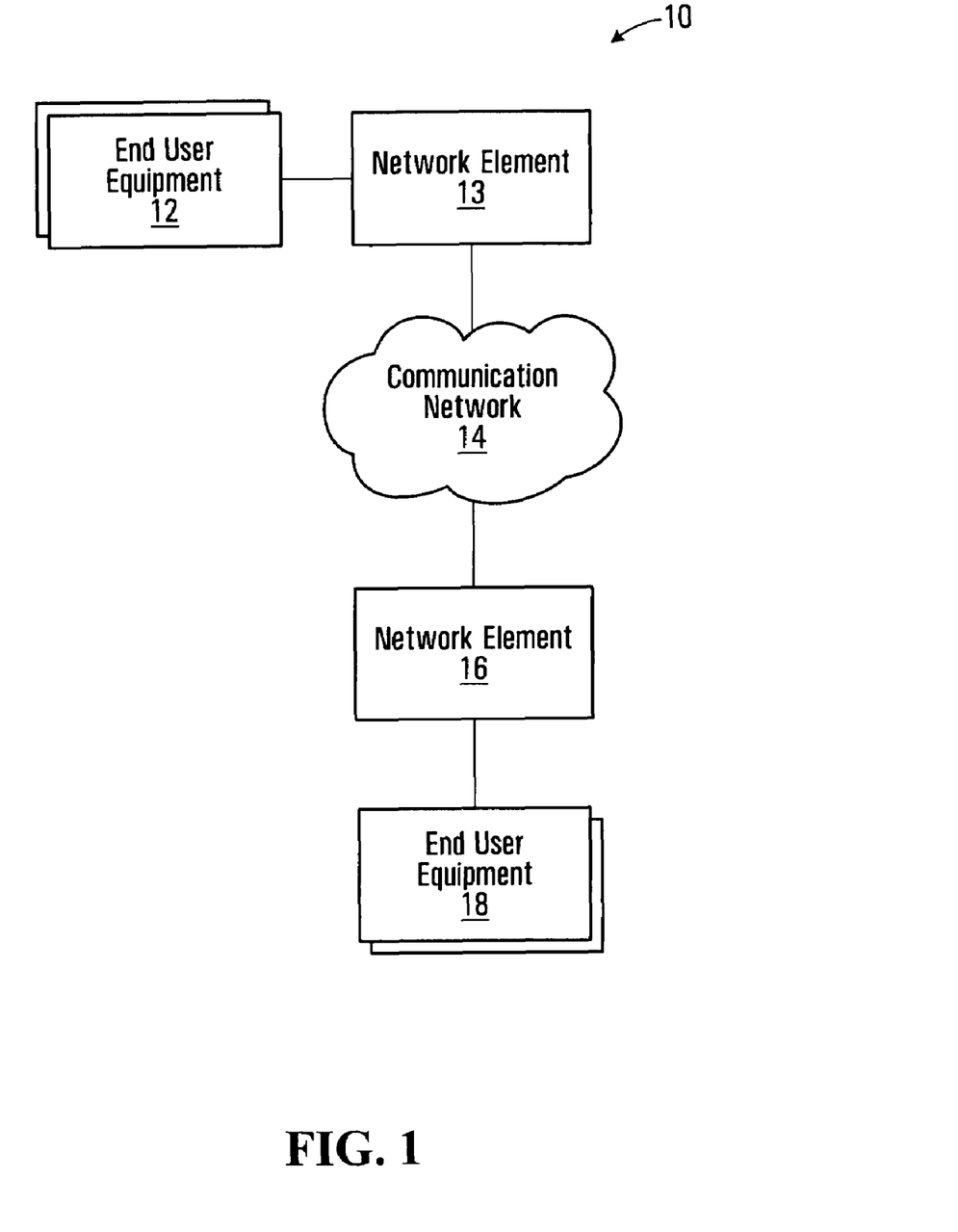
FIG. 1 is a block diagram of a communication system.

FIG. 1 is a block diagram of a communication system 10, in which some embodiments of the invention may be implemented. The communication system 10 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 to avoid overly complicating the drawing. It should therefore be appreciated that the system of FIG. 1, as well as the contents of the other drawings, are intended solely for illustrative purposes, and that the present invention is in no way limited to the particular example embodiments explicitly shown in the drawings and described herein. In general, embodiments of the invention may include fewer, further, or different components interconnected in a similar or different order than shown.

The end user equipment 12, 18 represents communication equipment that is configured to transmit and/or receive communication traffic, which may include any type(s) of information, such as data files, pictures, video, voice, etc. Although shown as being directly connected to the network elements 13, 16, it will be apparent that end user equipment 12, 18 may communicate with the network elements 13, 16 through other access components (not shown).

Switches and routers are illustrative of the types of communication equipment represented by the network elements 13, 16. The network elements 13, 16 provide access to the communication network 14 and thus have been shown separately in FIG. 1 for illustrative purposes. The communication network 14 may also include, in addition to the border or edge network elements 13, 16, core network elements that route communication traffic through the network.

Many different types of end user, access, and network communication equipment, as well as the operation thereof, will be apparent to those skilled in the art. In general, communication traffic originating with end user equipment 12, 18, and/or possibly other sources of communication traffic, for transfer to a destination through the communication network 14 is received by a network element 13, 16, translated between different protocols or formats if necessary, and routed through the communication network. Embodiments of the invention are not limited to any particular types of communication equipment, transfer mechanisms, or protocols.

As noted above, although point-to-point OAM techniques may be extended to emulated paths such as PWs provided intermediate PE nodes are configured to tunnel OAM packets to their connected CPEs, current specifications and node equipment do not provide any indication between PE nodes as to whether each PE node terminates or tunnels OAM packets. For example, there is no indication as to whether or not Ethernet ACs enable Ethernet OAM tunnelling in such control signalling protocols as T-LDP, for Ethernet PWs, or ATM Private Network-to-Network Interface (PNNI) or ATM Inter-Network Interface (AINI) for ATM Virtual Circuits (VCs) such as SPVCs.

Embodiments of the present invention propose PW signalling support to determine whether a far end AC enables Ethernet OAM tunnelling. An Ethernet PW between ACs will be brought into "in service" only if both ACs have the same configuration with respect to tunnelling Ethernet OAM traffic. Similarly, when ACs are connected by an SPVC in an ATM network, the PNNI or AINI control signalling protocols can be modified to support determination of OAM traffic handling configurations.

Aspects of the present invention are also described below more generally, in the context of handling communication path management traffic, which may include OAM Protocol Data Units (PDUs), for managing communication paths that include respective communication links. An Ethernet PW between PE nodes might be connected to CPEs through ACs, for example, and in this case the communication path to be managed includes the ACs and the PW.

Figure 2:
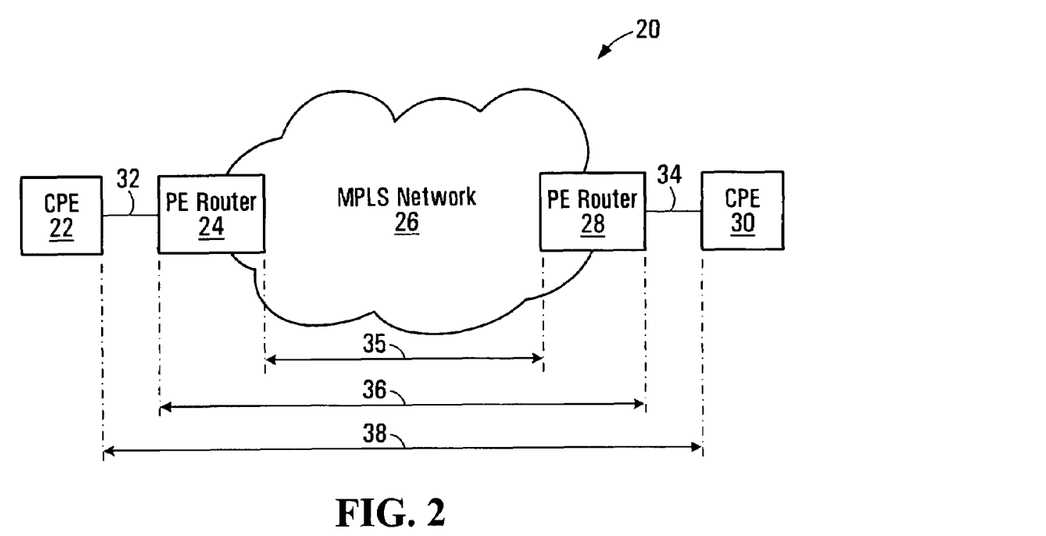
FIG. 2 is a block diagram of a more specific example of a communication system.

FIG. 2 is a block diagram of a more specific example of a communication system in which embodiments of the invention could be implemented. The communication system 20 includes CPEs 22, 30, PE routers 24, 28 as examples of communication system elements that might terminate a communication link, and an MPLS network 26 as an example of a communication network over which a communication link could be established. In the example shown, a communication path 38 between the CPEs 22, 30 includes not only a communication link 36, illustratively an Ethernet PW, between the PE routers 24, 28, but also respective links 32, 34, illustratively ACs, between the PE routers and the CPEs.

Consider the example of a PW between the PE routers 24, 28. When a PW is to be established through the MPLS network 26 to connect the ACs to which the CPEs 22, 30 are connected, the PE routers 24, 28 are configured and exchange PW signalling information in the form of PW labels associated with Attachment Individual Identifiers (AII) associated with the AC at each PE router. This exchange takes place over a T-LDP session between the PE routers 24, 28. In the case of an MPLS network 26 as shown in FIG. 2, each PE router 24, 28 adds to the packets it sends on the PW the PW label it received from the other PE router (i.e., an inner label) and a locally determined tunnel label for an MPLS tunnel 35 between the PE routers (i.e., an outer label) through the MPLS network 26. The tunnel label is used to forward a packet between the PE routers 24, 28, and is stripped before local PW processing takes place at a receiving PE. As part of that local processing, the inner label is then used to forward traffic on the PW toward the destination AII. The ACs at the PE routers 24, 28 may be configured to tunnel path management traffic for managing the end-to-end path 38, illustratively OAM packets, to the CPEs 22, 30.

In accordance with an aspect of the invention, an indication as to whether each AC enables Ethernet OAM tunnelling is provided during PW establishment. The indication is encoded into a new TLV included in label mapping messages in some embodiments. Since the information is exchanged by two PE routers in this case, the PE routers can decide whether the PW, which is capable of exchanging OAM traffic, should be brought into service. A PE would not bring the PW into service if it detects a mismatch in OAM tunnelling configurations. An error or exception process could also be invoked in this event, to raise an appropriate alarm, for example, such that an operator is made aware of the different configurations and can then act accordingly to resolve the misconfiguration.

Figure 3:
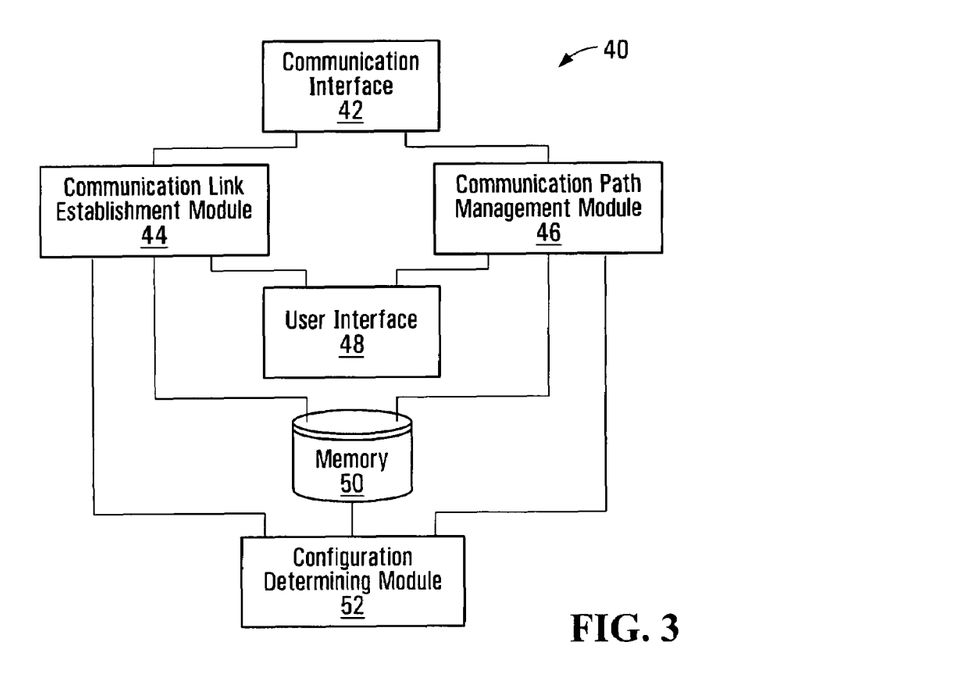
FIG. 3 is a block diagram of an apparatus according to an embodiment of the invention.

FIG. 3 is a block diagram of an apparatus according to an embodiment of the invention. The apparatus 40 includes a communication interface 42 operatively coupled to a communication link establishment module 44 and to a communication path management module 46, a user interface 48 operatively coupled to the communication link establishment module and to the communication path management module, and a memory 50 operatively coupled to the communication link establishment module, to the communication path management module, and to a configuration determining module 52. The configuration determining module 52 is also operatively coupled to the communication link establishment module 44 and to the communication path management module 46.

A communication system device or element in which or in conjunction with which the apparatus 40 is implemented may include other components in addition to those shown in FIG. 3. It should be appreciated that only components involved in determining path management traffic handling configurations have been explicitly shown in the apparatus 40. It should also be appreciated that not all of the components shown in FIG. 3 need necessarily be provided in every embodiment of the invention.

Thus, the apparatus 40 is representative of one illustrative embodiment of the invention. Other embodiments may be implemented using further, fewer, or different components than shown in FIG. 3, with similar or different interconnections.

The types of connections through which the components of FIG. 3 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers. The communication interface 42 and the configuration determining module 52 might also be considered to be indirectly coupled together. As described in further detail below, the configuration determining module 52 may receive indications of path management traffic handling configurations through the communication interface 42 either indirectly, through the communication link establishment module 44 and possibly the memory 50, or directly.

The communication interface 42 represents one or more interfaces, and possibly interfaces of multiple different types, that enable the apparatus 40 to at least exchange communication path management traffic with other apparatus. Although only a single communication interface 42 is shown in FIG. 3, multiple interfaces, and potentially different types of interfaces, may be provided in some embodiments to exchange path management traffic and/or other traffic such as control signalling for link establishment with other apparatus. A communication interface 42 that is used to exchange path management traffic need not necessarily be a dedicated interface. For example, a communication interface of a network element might be used for transfer of path management traffic, control signalling, and communication traffic.

In general, the number and types of communication interfaces may vary depending on the communication system and communication equipment in conjunction with which the apparatus 40 is implemented. Those skilled in the art will be familiar with many examples of communication interfaces.

The user interface 48 similarly represents one or more user interfaces for receiving inputs from a user. User inputs might be used to configure a communication link and/or control communication path management functions, for instance. User interface devices such as a keyboard and a pointing device might be provided at 48. Some user interface devices might provide both input and output functions, as in the case of a touchscreen. Physical interface devices may be used to support logical user interfaces such as a Graphical User Interface (GUI) or a Command Line Interface (CLI). Those skilled in the art will be familiar with many examples of user interfaces that are commonly used with communication equipment, as well as their operation.

One or more memory devices may be used to implement the memory 50. Solid state memory devices are common in communication and computing equipment, although other types of memory devices, including devices for use with movable or even removable storage media, may also or instead be used.

As described in further detail below, the communication link establishment module 44, the communication path management module 46, and the configuration determining module 52 may be involved in various aspects of determining management traffic handling configurations. At least these components may be implemented using hardware, firmware, software for execution by one or more processing elements, or some combination thereof. Any or all of devices such as microprocessors, microcontrollers, Programmable Logic Devices (PLDs), Field Programmable Gate Arrays (FPGAs), Application Specific Integrated Circuits (ASICs), Network Processors (NPs), and other types of "intelligent" integrated circuits may be suitable for this purpose.

Given the many possible options for implementing at least the modules 44, 46, 52, these components are described primarily in terms of their functions. Based on the functional descriptions, a person skilled in the art will be enabled to implement techniques according to embodiments of the invention in any of various ways.

The configuration determining module 52 is operable to determine respective communication path management traffic handling configurations of communication system elements that terminate a communication link. The communication link is a portion of a communication path that is associated with communication path management traffic. With reference to FIG. 2, the link 36 is an Ethernet PW in some embodiments, and is a portion of an end-to-end path 38 between the CPEs 22, 32. As those skilled in the art will appreciate, the PW in this example is an inner tunnel or logical communication path which is established through the outer MPLS tunnel 35 to connect two ACs of the PE routers 24, 28 though the MPLS network 26.

Where IEEE 802.3ah OAM PDUs are to be used in managing the path 38, it is important to ensure that OAM tunnelling has been properly configured and enabled at both of the PE routers 24, 28. The apparatus 40 could thus be implemented in conjunction with each of the PE routers 24, 28 to allow a configuration check to be made at each router.

In the case of an Ethernet PW, which includes two unidirectional paths to enable bidirectional communications, an apparatus 40 could be provided at each PE router 24, 28, and possibly integrated into each PE router, to check the configuration of the other PE router. If OAM PDU tunnelling has been configured appropriately at each PE router 24, 28, then the PE routers can use the link 36 to transfer OAM PDUs between the CPEs 22, 30. Otherwise, each PE router might terminate the OAM PDUs. The PE routers 24, 28, while terminating the communication link 36, thus might not necessarily terminate OAM PDUs and/or other forms of path management traffic.

The communication path management module 46 actually handles path management traffic in the example shown in FIG. 3. This module is thus operable to exchange communication path management traffic, for managing a communication path, through a communication link that forms part of the communication path if the respective communication path management traffic handling configurations of terminating communication system elements indicate that those elements have been configured to pass communication path management traffic associated with the communication path toward endpoints of the communication path. For example, the communication path management module 46 might include an OAM client and an OAM sub-layer in an IEEE 802.3ah-based embodiment. Thus, any of the management functions supported in IEEE 802.3ah may be supported in embodiments of the invention. Other similar or different management functions, such as connectivity monitoring for other types of communication links, may also or instead be supported.

Referring again to the example shown in FIG. 2, when the communication path management module at a PE router 24, 28 receives an OAM PDU from its CPE 22, 30, that module either terminates the OAM PDU or forwards the OAM PDU through the communication link 36. The communication path management module at the receiving PE router passes the path management traffic received on the communication link 36 toward a path endpoint (i.e., a CPE 22, 30). This allows a point-to-point protocol such as IEEE 802.3ah to run over the entire communication path 38. In the communication system 20, a communication path management module passes received path management traffic directly to a path endpoint. However, it should be appreciated that an intermediate communication system element such as a PE router 24, 28 might communicate with a path endpoint indirectly. References to passing path management traffic "toward" a path endpoint are intended to encompass both direct and indirect transfers of path management traffic to path endpoints.

The configuration determining module 52 may determine path management traffic handling configurations in any of various ways. For example, the communication interface 42 may enable communications through a communication link, and therefore the configuration determining module 52 could receive an indication of the communication path management traffic handling configuration of a communication system element through the interface. Such an indication could be received by the configuration determining module 52 from the communication interface 42 directly or indirectly.

One possible implementation of indirect configuration determination might involve the communication link establishment module 44. This module is operable to establish the communication link that forms part of a managed communication path. According to an embodiment of the invention, the communication link establishment module 44 receives an indication of the communication path management traffic handling configuration of a communication system element during establishment of the communication link, and provides the received indication to the configuration determining module 52. The communication link establishment module 44 might provide the indication to the configuration determining module 52 directly, or store the indication in the memory 50 for access by the configuration determining module.

When the apparatus 40 is implemented in, or in conjunction with, a first one of the communication system elements that terminate the communication link, such as the PE router 24 in the system 20 of FIG. 2, the memory 50 might also or instead be used to store an indication of the communication path management traffic handling configuration of that communication system element. Through the user interface 48 and the communication link establishment module 44, a system operator or other personnel might configure a communication link such as a PW, with configuration information being stored in the memory 50. The configuration determining module 52 can then determine the communication path management traffic handling configuration of the local communication system element by accessing the memory 50 or otherwise receiving from the memory a stored indication of configuration.

According to one embodiment, a local configuration is determined by accessing configuration information that was stored in the memory 50 during link establishment, and the configuration of a remote communication system element is received from the remote element.

The communication link establishment module 44 might also report the configuration of a local communication system element to a remote element that terminates the same link. Thus, two communication system elements that terminate a link, such as the PE routers 24, 28 (FIG. 2), may exchange their path management traffic handling configurations with each other. This would allow each element to independently check management traffic handling configurations for a communication link. This type of exchange might be particularly useful in the case of a communication link such as a PW, which is configured separately for opposite directions.

It should be apparent from the foregoing that a communication link that forms part of a communication path may be a PW, an ATM VC, or possibly some other form of a logical and/or physical communication link between communication system elements. The managed path may also include respective communication links, such as ACs, between communication system elements and customer equipment. In the case of a PW, an indication of path management traffic handling configuration could be included in a label mapping message. For an ATM link, such an indication may be provided in PNNI or AINI control signalling, for example.

Figure 4:
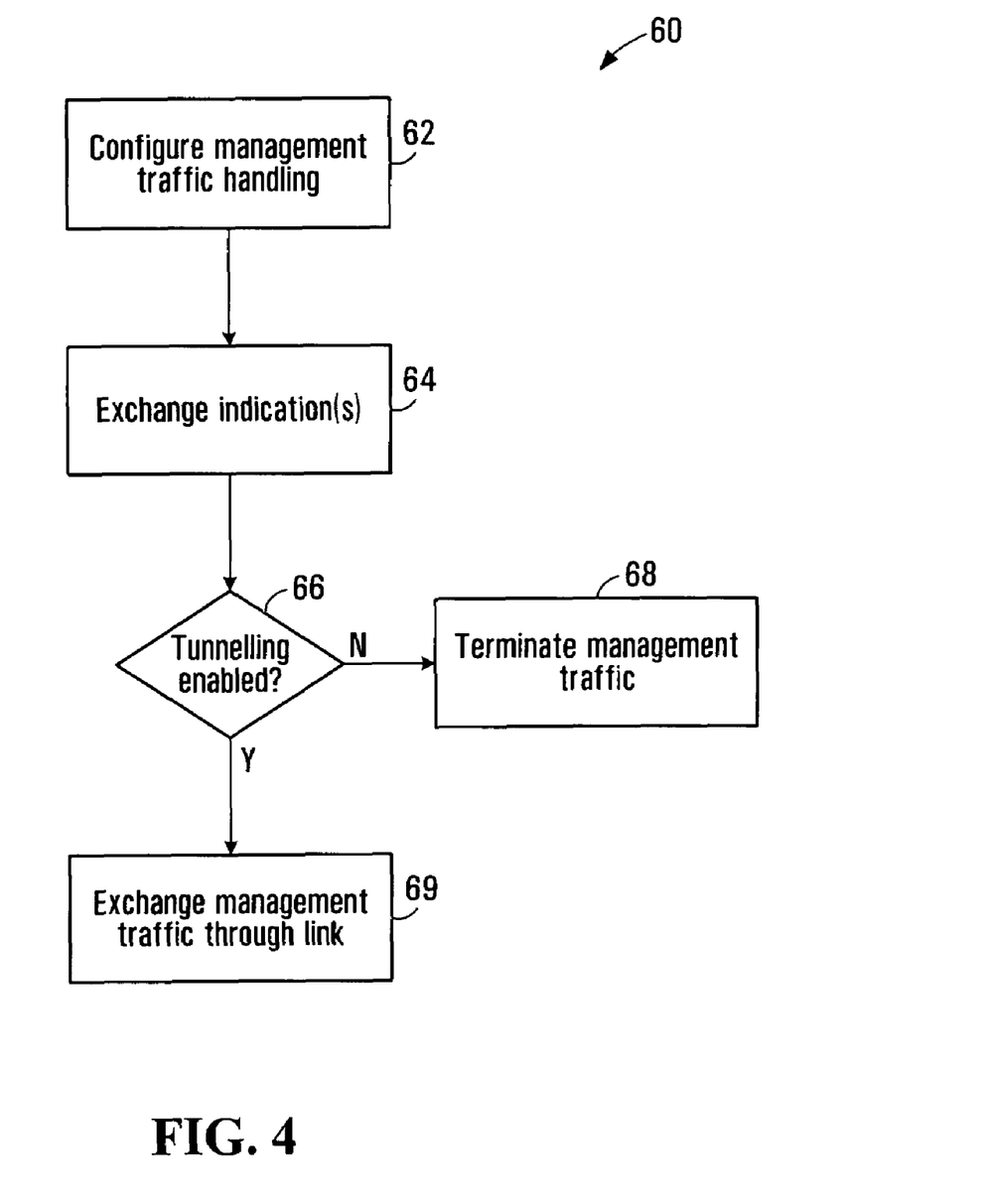
FIG. 4 is a block diagram of a method according to another embodiment of the invention.

FIG. 4 is a block diagram of a method according to another embodiment of the invention. The method 60 involves configuring a first communication system element to terminate an end of a communication link between the element and a second communication system element. The communication link, as noted above, forms part of a communication path. This configuration, as shown at 62, involves configuring path management traffic handling. In one embodiment, this is a configuration of AC tunnelling for OAM traffic.

Tunnelling or other handling characteristics for path management traffic such as OAM PDUs may, but need not necessarily, be configured separately from characteristics for other types of traffic such as communication traffic. In some embodiments, one tunnelling setting is applied to both communication traffic and path management traffic, whereas other embodiments may involve separately configuring tunnelling for different traffic types.

As those skilled in the art will appreciate, establishment of a communication link may involve configuration of communication system elements at each end of the link.

One or more indications of path management traffic handling configuration may be exchanged at 64. Each of the first and second communication system elements may send an indication of its configuration to the other element, for example.

A determination is then made at 66 as to whether respective communication path management traffic handling configurations of the first and second communication elements indicate that the elements have been configured to pass communication path management traffic associated with the communication path toward endpoints of the communication path. In the example shown, this determination involves determining whether tunnelling has been enabled. If so, then communication path management traffic for managing the communication path is exchanged through the communication link at 69, and otherwise the communication path management traffic is terminated at the first and second communication system elements, as shown at 68.

The method 60 is illustrative of one embodiment of the invention. Other embodiments may include fewer, further, or different operations, performed in a similar or different order, than shown. These and other operations may also be performed in any of various ways.

For example, the method 60 may be applied to any of various types of communication links, and accordingly the exchanges at 64 and/or 69 may be supported by different mechanisms. A TLV triplet in a label mapping message might be used at 64 where the link is a PW, for instance, whereas other indications such as flags or additional data fields could be included in control signalling associated with different protocols.

Further variations of the method 60 may be or become apparent to those skilled in the art, from the foregoing apparatus and communication system descriptions, for instance.

Figure 5A:
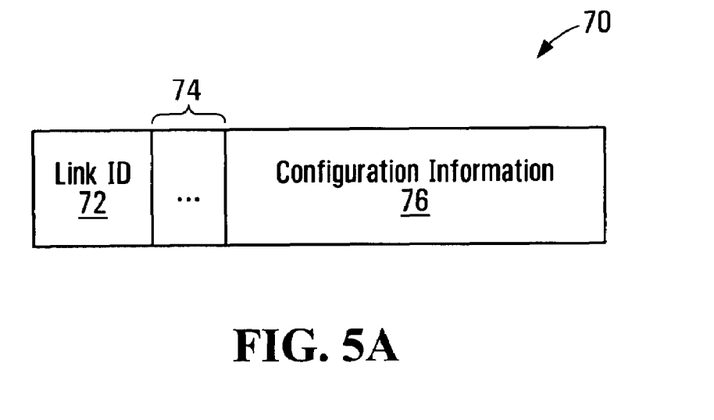
FIGS. 5A, 5B, and 5C are block diagrams illustrating example data structures that may be used in embodiments of the invention.
Figure 5B:
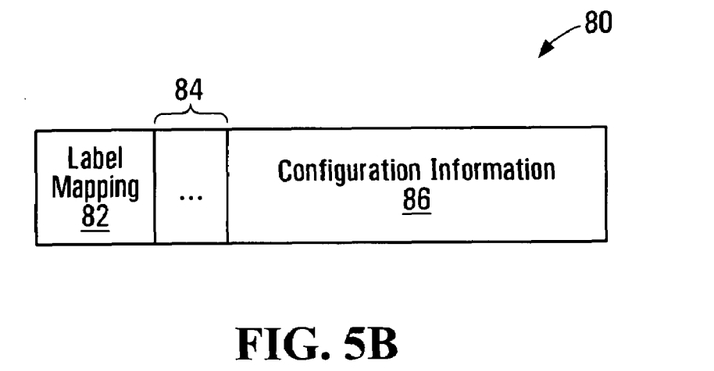
Figure 5C:
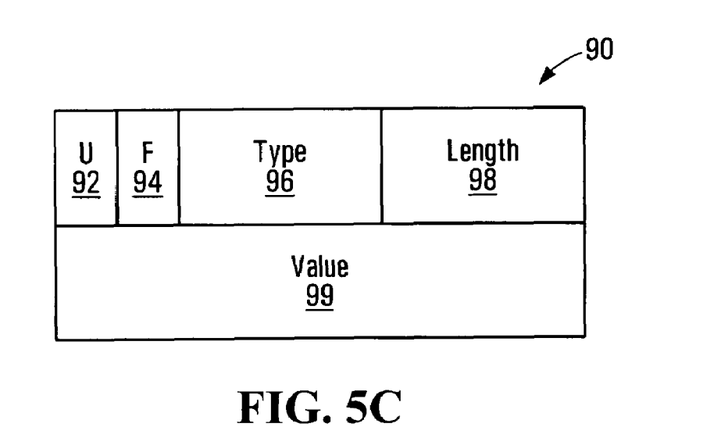

FIGS. 5A, 5B, and 5C are block diagrams illustrating example data structures that may be used in embodiments of the invention.

FIG. 5A shows an example of a data structure 70, which might be used to store configuration information in the memory 50 (FIG. 3). In this example, the data structure 70 includes a data field 70 for storing an identifier or other information indicative of a particular communication link and/or path, and a data field 76 for storing configuration information indicative of a configuration associated with the communication link/path identified at 72. The configuration information in the data field 76 includes at least an indication as to the path management traffic handling configuration of a communication system element associated with the identified link/path, and may also include other configuration information. Other data fields for storing any of various types of information associated with the identified link/path may also be provided, as shown at 74.

In FIG. 5B, a data structure 80, in which an indication of a management traffic handling configuration could be exchanged, is shown. The example data structure 80 represents a simple label mapping message and includes a data field 82 for label mapping information, and a data field 86 for at least management traffic handling configuration information. The data field 86 includes a configuration TLV in one embodiment An example of such a TLV is shown in FIG. 5C and described below. As for the data structure 70, the data structure 80 may include other data fields 84, and additional configuration information may be included in the data field 86.

FIG. 5C shows an example of a TLV format for an LDP message. The structure 90 includes an Unknown (U) TLV bit 92, a Forward (F) unknown TLV bit 94, a Type field 96 including information that encodes how the Value field 99 is to be interpreted, a Length field 98 that specifies the length of the Value field in octets, and the Value field itself, which includes an octet string of "Length" octets that encodes information to be interpreted as specified by the Type field.

In some embodiments, the U and F bits 92, 94 are set to one. A new Type value for Ethernet First Mile (EFM) OAM tunnelling, for example, may be defined for inclusion in the Type field 96. Those skilled in the art will appreciate that the assignment of a new Type value may involve review and approval by an authority such as the Internet Assigned Numbers Authority (IANA) or by a designated expert. Therefore, the present invention is in no way restricted to any specific value of the Type field 96.

The content of the Type field 96 may effectively be used as a flag to indicate that OAM tunnelling has or has not been enabled at an intermediate communication system element. For example, a TLV 90 including an OAM tunnelling Type value in its Type field 96 might only be included in an LDP message when OAM tunnelling has been enabled at a communication system element that sends the LDP message. In this case, the Length field 98 may be set to zero, and the Value field 99 is not included.

In other embodiments, the Value field 99 may have a non-zero length, and may include an explicit indication of whether or not OAM tunnelling has been enabled. For example, one value could be used in the Value field 98 to indicate that OAM tunnelling has been enabled, with a different value being used to indicate that OAM tunnelling has not been enabled.

The examples shown in FIGS. 5A, 5B, and 5C are intended solely for illustrative purposes. Other embodiments may use similar or different data or message formats that include further, fewer, or different fields arranged in a similar or different order than shown.

The tunnelling supports of 802.3ah Ethernet OAM could be used in conjunction with the techniques described herein as an effective end-to-end Ethernet OAM solution. Additional signalling of IEEE 802.3ah Ethernet OAM tunnelling configurations in a control signalling protocol, as described above, may yield a comprehensive end-to-end, point-to-point Ethernet OAM solution. Such a solution could be an alternative to such heavyweight mechanisms as the end-to-end multi-point mechanisms proposed in current IEEE 802.1ag Connectivity Fault Management specifications.

Embodiments of the invention may be used to provide a capability to proactively detect the Ethernet OAM tunnelling misconfigurations on ACs, for example, which may directly and negatively affect a customer's Ethernet OAM behaviour and actual service to the customer. As a result, this capability could be useful in helping a system or network operator to pin-point Ethernet OAM configuration problems on PE routers, for instance, and may also reduce overall operating expenditures.

What has been described is merely illustrative of the application of principles of embodiments of the invention. Other arrangements and methods can be implemented by those skilled in the art without departing from the scope of the present invention.

For example, the divisions of functions shown in FIG. 3 and similarly the flow of operations in FIG. 4 are intended solely for illustrative purposes. The present invention is in no way limited to the specific examples shown in the drawings and described above.

IEEE 802.3ah, Ethernet PWs, MPLS tunnels, and ATM VCs are also intended to be illustrative and not limiting. The techniques disclosed herein may be adapted to other types of protocols and/or communication links and paths as well.

In addition, although described primarily in the context of methods and systems, other implementations of the invention are also contemplated, as instructions stored on a computer-readable medium, for example.

I claim:

1. An apparatus comprising:
a configuration determining module operable to determine respective communication path management traffic handling configurations of communication system elements that terminate a communication link, the communication link comprising a portion of a communication path associated with communication path management traffic; and
a communication path management module operatively coupled to the configuration determining module and operable to exchange communication path management traffic, for managing the communication path, through the communication link where the respective communication path management traffic handling configurations indicate that the communication system elements have been configured to pass communication path management traffic associated with the communication path toward endpoints of the communication path.

2. The apparatus of claim 1, further comprising:
an interface operatively coupled to the configuration determining module and to the communication path management module, the interface being operable to enable communications through the communication link,
the configuration determining module being operable to determine the respective communication path management traffic handling configurations by receiving through the interface an indication of the communication path management traffic handling configuration of at least one of the communication system elements.

3. The apparatus of claim 2, further comprising:
a communication link establishment module operatively coupled to the interface and to the configuration determining module, the communication link establishment module being operable to establish the communication link, to receive, during establishment of the communication link, the indication of the communication path management traffic handling configuration of the at least one of the communication system elements, and to provide the received indication to the configuration determining module.

4. The apparatus of claim 3, wherein the communication link comprises a PseudoWire (PW) between the communication system elements,
wherein the communication path comprises the communication link and respective communication links between the communication system elements and customer equipment, and
wherein the indication comprises an indication in a label mapping message received from the at least one of the communication system elements.

5. The apparatus of claim 4, wherein the PW comprises an Ethernet PW, and wherein the communication path management traffic comprises Ethernet Operations, Administration and Maintenance (OAM) traffic.

6. The apparatus of claim 3, wherein the communication link comprises an Asynchronous Transfer Mode (ATM) Virtual Circuit (VC) between the communication system elements,
wherein the communication path comprises the communication link and respective communication links between the communication system elements and customer equipment, and
wherein the indication comprises an indication in control signalling received from the at least one of the communication system elements.

7. The apparatus of claim 2, wherein the apparatus is implemented in conjunction with a first one of the communication system elements and further comprises a memory storing an indication of the communication path management traffic handling configuration of the first communication system element, the configuration determining module being operable to determine the communication path management traffic handling configuration of the first communication system element by receiving from the memory the indication of the communication path management traffic handling configuration of the first communication system element, and
wherein the configuration determining module is operable to determine the communication path management traffic handling configuration of a second of the communication system elements by receiving through the interface an indication of the communication path management traffic handling configuration of the second communication system element.

8. The apparatus of claim 7, further comprising:
a communication link establishment module operatively coupled to the interface, to the configuration determining module, and to the memory, the communication link establishment module being operable to establish the communication link, to receive, during establishment of the communication link, the indication of the communication path management traffic handling configuration of the second communication system element, to provide the received indication to the configuration determining module, and to send to the second communication system element, through the interface, the stored indication of the communication path management traffic handling configuration of the first communication system element.

9. A communication system comprising:
a plurality of communication system elements, each communication system element comprising:
a configuration determining module operable to determine respective communication path management traffic handling configurations of communication system elements that terminate a communication link, the communication link comprising a portion of a communication path associated with communication path management traffic; and
a communication path management module operatively coupled to the configuration determining module and operable to exchange communication path management traffic, for managing the communication path, through the communication link where the respective communication path management traffic handling configurations indicate that the communication system elements have been configured to pass communication path management traffic associated with the communication path toward endpoints of the communication path.

10. A method comprising:
determining respective communication path management traffic handling configurations of communication system elements that terminate a communication link, the communication link comprising a portion of a communication path associated with communication path management traffic;
determining whether the respective communication path management traffic handling configurations indicate that the communication system elements have been configured to pass communication path management traffic associated with the communication path toward endpoints of the communication path; and exchanging communication path management traffic, for managing the communication path, through the communication link where it is determined that the respective communication path management traffic handling configurations indicate that the communication system elements have been configured to pass communication path management traffic associated with the communication path toward endpoints of the communication path.

11. The method of claim 10, wherein determining respective communication path management traffic handling configurations comprises receiving an indication of the communication path management traffic handling configuration of at least one of the communication system elements.

12. The method of claim 11, wherein receiving comprises receiving the indication of the communication path management traffic handling configuration of the at least one of the communication system elements during establishment of the communication link.

13. The method of claim 12, wherein the communication link comprises a PseudoWire (PW) between the communication system elements,
wherein the communication path comprises the communication link and respective communication links between the communication system elements and customer equipment, and
wherein receiving comprises receiving the indication in a label mapping message received from the at least one of the communication system elements.

14. The method of claim 13, wherein the PW comprises an Ethernet PW, and wherein the communication path management traffic comprises Ethernet Operations, Administration and Maintenance (OAM) traffic.

15. The method of claim 12, wherein the communication link comprises an Asynchronous Transfer Mode (ATM) Virtual Circuit (VC) between the communication system elements,
wherein the communication path comprises the communication link and respective communication links between the communication system elements and customer equipment, and
wherein receiving comprises receiving the indication in control signalling received from the at least one of the communication system elements.

16. The method of claim 11, implemented in conjunction with a first one of the communication system elements, the first communication system element comprising a memory storing an indication of the communication path management traffic handling configuration of the first communication system element, wherein determining respective communication path management traffic handling configurations comprises:
determining the communication path management traffic handling configuration of the first communication system element by receiving from the memory the indication of the communication path management traffic handling configuration of the first communication system element; and
determining the communication path management traffic handling configuration of a second of the communication system elements by receiving from the second communication system element an indication of the communication path management traffic handling configuration of the second communication system element.

17. The method of claim 16, further comprising:
sending to the second communication system element the stored indication of the communication path management traffic handling configuration of the first communication system element.

18. A computer-readable medium storing instructions executable by a computer, the instructions comprising:
instructions for determining respective communication path management traffic handling configurations of communication system elements that terminate a communication link, the communication link comprising a portion of a communication path associated with communication path management traffic;
instructions for determining whether the respective communication path management traffic handling configurations indicate that the communication system elements have been configured to pass communication path management traffic associated with the communication path toward endpoints of the communication path; and
instructions for exchanging communication path management traffic, for managing the communication path, through the communication link where it is determined that the respective communication path management traffic handling configurations indicate that the communication system elements have been configured to pass communication path management traffic associated with the communication path toward endpoints of the communication path.

19. An apparatus comprising:
an interface enabling communications through a communication link between first and second communication system elements that terminate the communication link, the communication link comprising a portion of a communication path; and
a communication link establishment module operatively coupled to the interface, the communication link establishment module being operable to establish the communication link at the first communication system element, and to send to the second communication system element, during establishment of the communication link, an indication of a configuration of the first communication system element for handling communication path management traffic associated with the communication path.

20. The apparatus of claim 19, wherein the communication link comprises a PseudoWire (PW) between the first and second communication system elements,
wherein the communication path comprises the communication link and respective communication links between the first and second communication system elements and customer equipment, and
wherein the indication comprises an indication in a label mapping message sent to the second communication system element.

21. The apparatus of claim 20, wherein the PW comprises an Ethernet PW, and wherein the communication path management traffic comprises Ethernet Operations, Administration and Maintenance (OAM) traffic.

22. The apparatus of claim 19, wherein the communication link comprises an Asynchronous Transfer Mode (ATM) Virtual Circuit (VC) between the communication system elements,
wherein the communication path comprises the communication link and respective communication links between the communication system elements and customer equipment, and
wherein the indication comprises an indication in control signalling sent to the second communication system element.

23. The apparatus of claim 19, further comprising:
a memory operatively coupled to the communication link establishment module, the memory storing an indication of the configuration of the first communication system element,
the communication link establishment module being further operable to receive the indication from the memory.

24. A method comprising:
configuring a first communication system element to terminate an end of a communication link between the first communication system element and a second communication system element, the communication link comprising a portion of a communication path; and
sending to the second communication system element an indication of a configuration of the first communication system element for handling communication path management traffic associated with the communication path.

* * * * *